US012231864B2

United States Patent
Lee et al.

(10) Patent No.: US 12,231,864 B2
(45) **Date of Patent: *Feb. 18, 2025**

(54) APPARATUS AND METHOD FOR PROCESSING MULTI-CHANNEL AUDIO SIGNAL

(71) Applicant: Electronics and Telecommunications Research Institute, Daejeon (KR)

(72) Inventors: Yong Ju Lee, Daejeon (KR); Jeong Il Seo, Daejeon (KR); Seung Kwon Beack, Daejeon (KR); Kyeong Ok Kang, Daejeon (KR); Jin Woong Kim, Daejeon (KR); Jae Hyoun Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,897

(22) Filed: Dec. 1, 2023

(65) Prior Publication Data

US 2024/0098437 A1 Mar. 21, 2024

Related U.S. Application Data

(63) Continuation of application No. 17/877,696, filed on Jul. 29, 2022, now Pat. No. 11,871,204, which is a (Continued)

(30) Foreign Application Priority Data

Apr. 19, 2013 (KR) ........................ 10-2013-0043383
Apr. 18, 2014 (KR) ........................ 10-2014-0046741

(51) Int. Cl.
*H04S 3/00* (2006.01)
*G10L 19/008* (2013.01)
*G10L 21/0316* (2013.01)

(52) U.S. Cl.
CPC ............ *H04S 3/008* (2013.01); *G10L 19/008* (2013.01); *H04S 2400/01* (2013.01)

(58) Field of Classification Search
CPC ..... H04S 3/008; H04S 2400/01; G10L 19/008
See application file for complete search history.

(56) References Cited

U.S. PATENT DOCUMENTS 5,371,799 A 12/1994 Lowe et al.
5,436,975 A 7/1995 Lowe et al.
(Continued)

FOREIGN PATENT DOCUMENTS

CN 1630434 A 6/2005
CN 101366081 A 2/2009
(Continued)

OTHER PUBLICATIONS

Jot et al., Beyond Surround sound—Creation, Coding and Reproduction of 3-D Audio Soundtracks, Audio Engineering Society, 2011, whole document (Year: 2011).
(Continued)

*Primary Examiner* — Sonia L Gay
(74) *Attorney, Agent, or Firm* — William Park & Associates Ltd.

(57) ABSTRACT

Disclosed is an apparatus and method for processing a multichannel audio signal. A multichannel audio signal processing method may include: generating an N-channel audio signal of N channels by down-mixing an M-channel audio signal of M channels; and generating a stereo audio signal by performing binaural rendering of the N-channel audio signal.

6 Claims, 6 Drawing Sheets

Related U.S. Application Data continuation of application No. 16/703,226, filed on Dec. 4, 2019, now Pat. No. 11,405,738, which is a continuation of application No. 16/126,466, filed on Sep. 10, 2018, now Pat. No. 10,701,503, which is a continuation of application No. 14/767,538, filed as application No. PCT/KR2014/003424 on Apr. 18, 2014, now Pat. No. 10,075,795.

(56) References Cited

U.S. PATENT DOCUMENTS 5,596,644 A 1/1997 Abel et al.
5,742,689 A 4/1998 Tucker et al.
5,987,142 A 11/1999 Courneau et al.
6,180,866 B1 1/2001 Kitamura
6,188,769 B1 2/2001 Jot et al.
6,628,787 B1 9/2003 McGrath et al.
6,639,989 B1 10/2003 Zacharov et al.
6,925,426 B1 8/2005 Hartmann
6,928,179 B1 8/2005 Yamada et al.
6,970,569 B1 11/2005 Yamada
7,099,482 B1 8/2006 Jot et al.
7,146,296 B1 12/2006 Carlbom et al.
7,215,782 B2 5/2007 Chen
7,536,021 B2 5/2009 Dickins et al.
7,903,824 B2 3/2011 Faller et al.
7,936,887 B2 5/2011 Smyth
8,081,762 B2 12/2011 Ojala et al.
8,265,284 B2 9/2012 Villemoes et al.
8,270,616 B2 9/2012 Slamka et al.
8,325,929 B2 12/2012 Koppens et al.
9,215,544 B2 12/2015 Faure et al.
9,226,089 B2 12/2015 Mundt et al.
9,319,819 B2 4/2016 Lee et al.
9,344,826 B2 5/2016 Ramo et al.
9,462,387 B2 10/2016 Oomen et al.
9,842,597 B2 12/2017 Lee et al.
9,918,179 B2 3/2018 Kuhr et al.
9,986,365 B2 5/2018 Lee et al.
10,199,045 B2 2/2019 Lee et al.
10,614,820 B2 4/2020 Lee et al.
10,950,248 B2 3/2021 Lee et al.
2002/0122559 A1 9/2002 Fay et al.
2003/0236814 A1 12/2003 Miyasaka et al.
2005/0018039 A1 1/2005 Lucioni
2005/0053249 A1 3/2005 Wu et al.
2005/0063551 A1 3/2005 Cheng et al.
2005/0276430 A1 12/2005 He et al.
2006/0045294 A1 3/2006 Smyth
2006/0086237 A1 4/2006 Burwen
2007/0019813 A1 1/2007 Hilpert et al.
2007/0133831 A1 6/2007 Kim et al.
2007/0140498 A1 6/2007 Moon et al.
2007/0160219 A1 7/2007 Jakka et al.
2007/0172086 A1 7/2007 Dickins et al.
2007/0213990 A1 9/2007 Moon et al.
2007/0223708 A1 9/2007 Villemoes et al.
2007/0223749 A1 9/2007 Kim et al.
2007/0244706 A1 10/2007 Tsushima
2007/0280485 A1 12/2007 Villemoes
2007/0297616 A1 12/2007 Plogsties et al.
2008/0008327 A1 1/2008 Ojala et al.
2008/0008342 A1 1/2008 Sauk
2008/0031462 A1 2/2008 Walsh et al.
2008/0033729 A1 2/2008 Ko et al.
2008/0033732 A1* 2/2008 Seefeldt ................ G10L 19/008
704/500
2008/0037795 A1 2/2008 Ko et al.
2008/0049943 A1 2/2008 Faller et al.
2008/0097750 A1 4/2008 Seefeldt et al.
2008/0175396 A1 7/2008 Ko et al.
2008/0192941 A1 8/2008 Oh et al.
2008/0205658 A1 8/2008 Breebaart
2008/0240448 A1 10/2008 Gustafsson et al.
2008/0273708 A1 11/2008 Sandgren et al.
2008/0306720 A1 12/2008 Nicol et al.
2009/0012796 A1 1/2009 Jung et al.
2009/0043591 A1 2/2009 Breebaart et al.
2009/0046864 A1 2/2009 Mahabub et al.
2009/0103738 A1 4/2009 Faure et al.
2009/0129601 A1 5/2009 Ojala et al.
2009/0144063 A1 6/2009 Beack et al.
2009/0281804 A1 11/2009 Watanabe et al.
2010/0017002 A1 1/2010 Oh et al.
2010/0017195 A1 1/2010 Villemoes
2010/0046762 A1 2/2010 Henn et al.
2010/0094631 A1 4/2010 Engdegard et al.
2010/0119075 A1 5/2010 Xiang et al.
2010/0191537 A1 7/2010 Breebaart
2010/0223061 A1 9/2010 Ojanpera
2010/0246832 A1 9/2010 Villemoes et al.
2011/0044457 A1 2/2011 Seo et al.
2011/0081023 A1 4/2011 Raghuvanshi et al.
2011/0135098 A1 6/2011 Kuhr et al.
2011/0158416 A1 6/2011 Yuzuriha
2011/0170721 A1 7/2011 Dickins et al.
2011/0211702 A1 9/2011 Mundt et al.
2011/0261966 A1 10/2011 Engdegard
2011/0264456 A1 10/2011 Koppens et al.
2011/0317522 A1 12/2011 Florencio et al.
2012/0010879 A1 1/2012 Tsujino et al.
2012/0082319 A1 4/2012 Jot et al.
2012/0093323 A1* 4/2012 Lee ........................... H04S 3/00
381/23
2012/0140938 A1 6/2012 Yoo
2012/0201405 A1 8/2012 Slamka et al.
2012/0213375 A1 8/2012 Mahabub et al.
2012/0224702 A1 9/2012 Brinker et al.
2012/0243713 A1 9/2012 Hess
2012/0263311 A1 10/2012 Neugebauer et al.
2012/0314876 A1 12/2012 Vilkamo et al.
2012/0328107 A1 12/2012 Nyström et al.
2013/0058492 A1 3/2013 Silzle et al.
2013/0142341 A1 6/2013 Galdo et al.
2013/0202125 A1 8/2013 Sena et al.
2013/0216059 A1 8/2013 Yoo
2013/0236040 A1 9/2013 Crawford et al.
2013/0268280 A1 10/2013 Galdo et al.
2013/0268281 A1 10/2013 Walther
2013/0272527 A1 10/2013 Oomen et al.
2014/0019146 A1 1/2014 Neuendorf et al.
2014/0037094 A1 2/2014 Ma et al.
2014/0072126 A1 3/2014 Uhle et al.
2014/0153727 A1 6/2014 Walsh et al.
2014/0169568 A1 6/2014 Li et al.
2014/0270216 A1 9/2014 Tsilfidis et al.
2014/0348354 A1 11/2014 Christoph et al.
2014/0350944 A1* 11/2014 Jot .......................... G10L 19/20
704/500
2014/0355793 A1 12/2014 Dublin et al.
2014/0355794 A1 12/2014 Morrell et al.
2014/0355795 A1 12/2014 Xiang et al.
2014/0355796 A1 12/2014 Xiang et al.
2015/0030160 A1 1/2015 Lee et al.
2015/0125010 A1 5/2015 Yang et al.
2015/0199973 A1 7/2015 Borsum et al.
2015/0213807 A1 7/2015 Breebaart et al.
2015/0256956 A1 9/2015 Jensen et al.
2015/0350801 A1 12/2015 Koppens et al.
2015/0358754 A1 12/2015 Koppens et al.
2016/0029144 A1 1/2016 Cartwright et al.
2016/0088407 A1 3/2016 Elmedyb et al.
2016/0142854 A1 5/2016 Fueg et al.
2016/0232902 A1 8/2016 Lee et al.
2016/0275956 A1 9/2016 Lee et al.
2018/0091927 A1 3/2018 Lee et al.
2018/0102131 A1 4/2018 Lee et al.
2021/0067898 A1 3/2021 Neukam et al.
2021/0201923 A1 7/2021 Lee et al.

FOREIGN PATENT DOCUMENTS

CN 101366321 A 2/2009
CN 101809654 A 8/2010

(56) References Cited

FOREIGN PATENT DOCUMENTS

| | | | |
|---|---|---|---|
| JP | 2012227647 | A | 11/2012 |
| KR | 100754220 | B1 | 9/2007 |
| KR | 1020080078907 | A | 8/2008 |
| KR | 1020100063113 | A | 6/2010 |
| KR | 1020100106193 | A | 10/2010 |
| KR | 1020110039545 | A | 4/2011 |
| KR | 1020120038891 | A | 4/2012 |
| KR | 101175592 | B1 | 8/2012 |
| KR | 1020130004373 | A | 1/2013 |
| WO | 9914983 | A1 | 3/1999 |
| WO | 9949574 | A1 | 9/1999 |

OTHER PUBLICATIONS

Neuendorf et al., Unified Speech and Audio Coding Scheme for High Quality at Low Bitrates, IEEE, 2009, whole document (Year: 2009).

* cited by examiner

FIG. 5

| | | | | | | Output Formats | | | | Input Formats | | | |
|---|---|---|---|---|---|---|---|---|---|---|---|---|---|
| No. | LS Label | Az° | Az. Tol.° | El.° | El. Tol.° | O-5.1 | O-8.1 | O-10.1 | O-22.2 | I-8.1 | I-9.1 | I-11.1 | I-22.2 |
| 1 | M+000 | 0 | ±2 | 0 | ±2 | X | | X | X | | X | X | X |
| 2 | M+030 | 30 | ±2 | 0 | ±2 | X | X | X | X | X | X | X | X |
| 3 | M-030 | -30 | ±2 | 0 | ±2 | X | X | X | X | X | X | X | X |
| 4 | M+060 | 60 | ±2 | 0 | ±2 | | | | X | | | | X |
| 5 | M-060 | -60 | ±2 | 0 | ±2 | | | | X | | | | X |
| 6 | M+090 | 90 | ±5 | 0 | ±2 | | | | X | | | | X |
| 7 | M-090 | -90 | ±5 | 0 | ±2 | | | | X | | | | X |
| 8 | M+110 | 110 | ±5 | 0 | ±2 | X | X | X | | X | X | X | |
| 9 | M-110 | -110 | ±5 | 0 | ±2 | X | X | X | | X | X | X | |
| 10 | M+135 | 135 | ±5 | 0 | ±2 | | | | X | | | | X |
| 11 | M-135 | -135 | ±5 | 0 | ±2 | | | | X | | | | X |
| 12 | M+180 | 180 | ±5 | 0 | ±2 | | | | X | | | | X |
| 13 | U+000 | 0 | ±2 | 35 | ±10 | | X | | X | | | X | X |
| 14 | U+045 | 45 | ±5 | 35 | ±10 | | | | X | | | | X |
| 15 | U-045 | -45 | ±5 | 35 | ±10 | | | | X | | | | X |
| 16 | U+030 | 30 | ±5 | 35 | ±10 | | X | X | | X | X | X | |
| 17 | U-030 | -30 | ±5 | 35 | ±10 | | X | X | | X | X | X | |
| 18 | U+090 | 90 | ±5 | 35 | ±10 | | | | X | | | | X |
| 19 | U-090 | -90 | ±5 | 35 | ±10 | | | | X | | | | X |
| 20 | U+110 | 110 | ±5 | 35 | ±10 | | | X | | X | X | X | |
| 21 | U-110 | -110 | ±5 | 35 | ±10 | | | X | | X | X | X | |
| 22 | U+135 | 135 | ±5 | 35 | ±10 | | | | X | | | | X |
| 23 | U-135 | -135 | ±5 | 35 | ±10 | | | | X | | | | X |
| 24 | U+180 | 180 | ±5 | 35 | ±10 | | | | X | | | | X |
| 25 | T+000 | 0 | ±2 | 90 | ±10 | | | X | X | | | X | X |
| 26 | L+000 | 0 | ±2 | -15 | +5-25 | | X | | X | | | | X |
| 27 | L+045 | 45 | ±5 | -15 | +5-25 | | | | X | | | | X |
| 28 | L-045 | -45 | ±5 | -15 | +5-25 | | | | X | | | | X |
| 29 | LTE1 | 45 | ±15 | -15 | ±15 | X | X | X | X | X | X | X | X |
| 30 | LTE2 | -45 | ±15 | -15 | ±15 | | | | X | | | | X |

APPARATUS AND METHOD FOR PROCESSING MULTI-CHANNEL AUDIO SIGNAL

CROSS-REFERENCE TO RELATED APPLICATIONS

The present application is a continuation application of U.S. patent application Ser. No. 17/877,696, filed on Jul. 29, 2022, which is a continuation application of U.S. patent application Ser. No. 16/703,226, filed on Dec. 4, 2019, which is a continuation application of U.S. patent application Ser. No. 16/126,466, filed on Sep. 10, 2018, which is a continuation application of U.S. patent application Ser. No. 14/767,538, filed on Aug. 12, 2015, which was the National Stage of International Application No. PCT/KR2014/003424 filed on Apr. 18, 2014, which claims priority under 35 U.S.C. § 119(a) to Korean Patent Applications: KR10-2013-0043383, filed on Apr. 19, 2013, and KR10-2014-0046741, filed on Apr. 18, 2014, with the Korean Intellectual Property Office, which are incorporated herein by reference in their entirety.

TECHNICAL FIELD

Embodiments of the present invention relate to a multichannel audio signal processing apparatus included in a three-dimensional (3D) audio decoder and a multichannel audio signal processing method.

BACKGROUND ART

With the enhancement in the quality of multimedia contents, a high quality multichannel audio signal, such as a 7.1 channel audio signal, a 10.2 channel audio signal, a 13.2 channel audio signal, and a 22.2 channel audio signal, having a relatively large number of channels compared to an existing 5.1 channel audio signal, has been used. However, in many cases, the high quality multichannel audio signal may be listened to with a 2-channel stereo loudspeaker or a headphone through a personal terminal such as a smartphone or a personal computer (PC).

Accordingly, binaural rendering technology for down-mixing a multichannel audio signal to a stereo audio signal has been developed to make it possible to listen to the high quality multichannel audio signal with a 2-channel stereo loudspeaker or a headphone.

The existing binaural rendering may generate a binaural stereo audio signal by filtering each channel of a 5.1 channel audio signal or a 7.1 channel audio signal through a binaural filter such as a head related transfer function (HRTF) or a binaural room impulse response (BRIR). In the existing method, an amount of filtering calculation may increase according to an increase in the number of channels of an input multichannel audio signal.

Accordingly, in a case in which an amount of calculation increases according to an increase in the number of channels of a multichannel audio signal, such as a 10.2 channel audio signal and a 22.2 channel audio signal, it may be difficult to perform a real-time calculation for playback using a 2-channel stereo loudspeaker or a headphone. In particular, a mobile terminal having a relatively low calculation capability may not readily perform a binaural filtering calculation in real time according to an increase in the number of channels of a multichannel audio signal.

Accordingly, there is a need for a method that may decrease an amount of calculation required for binaural filtering to make it possible to perform a real-time calculation when rendering a high quality multichannel audio signal having a relatively large number of channels to a binaural signal.

DISCLOSURE OF INVENTION

Technical Goals

An aspect of the present invention provides an apparatus and method that may down-mix an input multichannel audio signal and then perform binaural rendering, thereby decreasing an amount of calculation required for binaural rendering although the number of channels of the multichannel audio signal increases.

Technical Solutions

According to an aspect of the present invention, there is provided a multichannel audio signal processing method including: generating an N-channel audio signal of N channels by down-mixing an M-channel audio signal of M channels; and generating a stereo audio signal by performing binaural rendering of the N-channel audio signal.

The generating of the stereo audio signal may include: generating channel-by-channel stereo audio signals using filters corresponding to playback locations of channel-by-channel audio signals of the N channels; and generating the stereo audio signal by mixing the channel-by-channel stereo audio signals.

The generating of the stereo audio signal may include generating the stereo audio signal using a plurality of binaural renderers respectively corresponding to the channels of the N-channel audio signal.

According to another aspect of the present invention, there is provided a multichannel audio signal processing method including: sub-sampling the number of channels of the multichannel audio signal based on a virtual loudspeaker layout; and generating a stereo audio signal by performing binaural rendering of the sub-sampled multichannel audio signal.

The generating of the stereo audio signal may include performing binaural rendering of the sub-sampled multichannel audio signal in a frequency domain.

The generating of the stereo audio signal may include generating the stereo audio signal using a plurality of binaural renderers respectively corresponding to the channels of the N-channel audio signal.

According to still another aspect of the present invention, there is provided a multichannel audio signal processing method including: sub-sampling the number of channels of the multichannel audio signal based on a three-dimensional (3D) loudspeaker layout; and generating a stereo audio signal by performing binaural rendering of the sub-sampled multichannel audio signal.

The generating of the stereo audio signal may include performing binaural rendering of the sub-sampled multichannel audio signal in a frequency domain.

The generating of the stereo audio signal may include generating the stereo audio signal using a plurality of binaural renderers respectively corresponding to the channels of the N-channel audio signal.

According to still another aspect of the present invention, there is provided a multichannel audio signal processing apparatus including: a channel down-mixing unit configured to generate an N-channel audio signal of N channels by down-mixing an M-channel audio signal of M channels; and a binaural rendering unit configured to generate a stereo audio signal by performing binaural rendering of the N-channel audio signal.

The binaural rendering unit may generate channel-by-channel stereo audio signals using filters corresponding to playback locations of channel-by-channel audio signals of the N channels, and may generate the stereo audio signal by mixing the channel-by-channel stereo audio signals.

The binaural rendering unit may generate the stereo audio signal using a plurality of binaural renderers respectively corresponding to the channels of the N-channel audio signal.

According to still another aspect of the present invention, there is provided a multichannel audio signal processing apparatus including: a channel down-mixing unit configured to sub-sample the number of channels of a multichannel audio signal based on a virtual loudspeaker layout; and a binaural rendering unit configured to generate a stereo audio signal by performing binaural rendering of the sub-sampled multichannel audio signal.

The binaural rendering unit may perform binaural rendering of the sub-sampled multichannel audio signal in a frequency domain.

The binaural rendering unit may generate the stereo audio signal using a plurality of binaural renderers respectively corresponding to the channels of the N-channel audio signal.

According to still another aspect of the present invention, there is provided a multichannel audio signal processing apparatus including: a channel down-mixing unit configured to sub-sample the number of channels of the multichannel audio signal based on a 3D loudspeaker layout; and a binaural rendering unit configured to generate a stereo audio signal by performing binaural rendering of the sub-sampled multichannel audio signal.

The binaural rendering unit may perform binaural rendering of the sub-sampled multichannel audio signal in a frequency domain.

The binaural rendering unit may generate the stereo audio signal using a plurality of binaural renderers respectively corresponding to the channels of the N-channel audio signal.

Effects of the Invention

According to embodiments of the present invention, it is possible to down-mix an input multichannel audio signal and then perform binaural rendering, thereby decreasing an amount of calculation required for binaural rendering although the number of channels of the multichannel audio signal increases.

BRIEF DESCRIPTION OF DRAWINGS

FIG. 5 is a table showing an example of location information of a loudspeaker used by a multichannel audio signal processing apparatus according to an embodiment of the present invention.

BEST MODE FOR CARRYING OUT THE INVENTION

Figure 1:
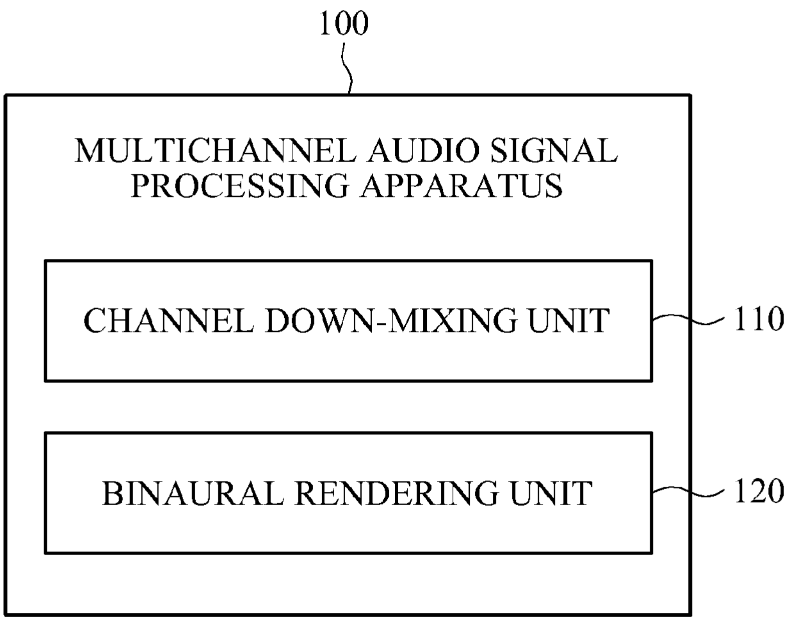
FIG. 1 is a block diagram illustrating a multichannel audio signal processing apparatus according to an embodiment of the present invention.

Reference will now be made in detail to embodiments of the present invention, examples of which are illustrated in the accompanying drawings, wherein like reference numerals refer to like elements throughout. The embodiments are described below in order to explain the present invention by referring to the figures. A multichannel audio signal processing method according to an embodiment of the present invention may be performed by a multichannel audio signal processing apparatus according to an embodiment of the present invention.

FIG. 1 is a block diagram illustrating a multichannel audio signal processing apparatus according to an embodiment of the present invention.

Referring to FIG. 1, a multichannel audio signal processing apparatus 100 may include a channel down-mixing unit 110 and a binaural rendering unit 120.

The channel down-mixing unit 110 may generate an N-channel audio signal of N channels by down-mixing an M-channel audio signal of M channels. Here, the M channels denote the number of channels greater than the N channels (N<M).

For example, when an M-channel audio signal includes three-dimensional (3D) spatial information, the channel down-mixing unit 110 may down-mix the M-channel audio signal to minimize loss of the 3D spatial information included in the M-channel audio signal. Here, the 3D spatial information may include a height channel.

For example, in the case of down-mixing the M-channel audio signal having a 3D channel layout to an N-channel audio signal having a two-dimensional (2D) channel layout, it may be difficult to reproduce 3D spatial information of the M-channel audio signal using the N-channel audio signal.

Accordingly, when the M-channel audio signal includes the 3D spatial information, the channel down-mixing unit 110 may down-mix the M-channel audio signal so that even the N-channel audio signal generated through down-mixing may include the 3D spatial information. In detail, when the M-channel audio signal includes the 3D spatial information, the channel down-mixing unit 110 may down-mix the M-channel audio signal based on a channel layout including the 3D spatial information.

For example, when an input multichannel audio signal has a 22.2 channel layout among 3D channel layouts, the channel down-mixing unit 110 may generate a 10.2 channel or 8.1 channel audio signal that provides a sound field similar to a 22.2 channel audio signal through down-mixing and also has the minimum number of channels.

The binaural rendering unit 120 may generate a stereo audio signal by performing binaural rendering of the N-channel audio signal generated by the channel down-mixing unit 110. For example, the binaural rendering unit 120 may generate channel-by-channel stereo audio signals using a plurality of binaural rendering filters corresponding to playback locations of channel-by-channel audio signals of the N channels of the N-channel audio signal, and may generate a single stereo audio signal by mixing the channel-by-channel stereo audio signals.

Figure 2:
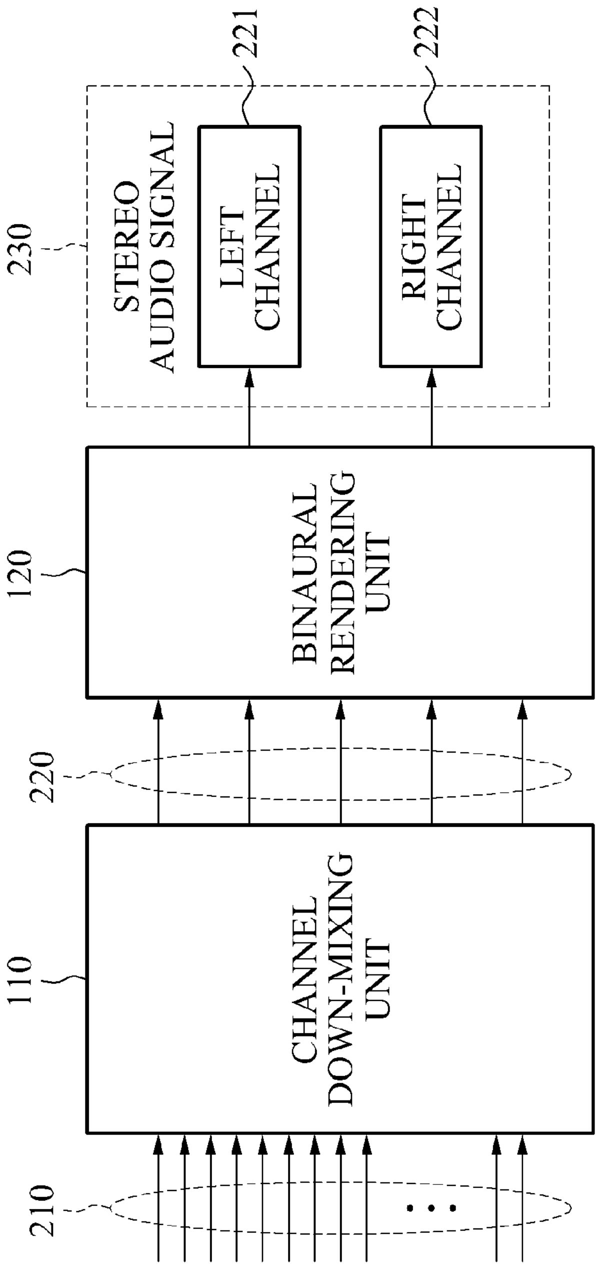
FIG. 2 is a diagram illustrating a multichannel audio signal processing apparatus according to an embodiment of the present invention.

FIG. 2 is a diagram illustrating a multichannel audio signal processing apparatus according to an embodiment of the present invention.

The channel down-mixing unit 110 may receive an M-channel audio signal 210 of M channels corresponding to a multichannel audio signal. The channel down-mixing unit 110 may output an N-channel audio signal 220 of N channels by down-mixing the M-channel audio signal 210. Here, the number of channels of the N-channel audio signal 220 may be less than the number of channels of the M-channel audio signal 210.

When the M-channel audio signal 210 includes 3D spatial information, the channel down-mixing unit 110 may down-mix the M-channel audio signal 210 to the N-channel audio signal 220 having a 3D layout to minimize loss of the 3D spatial information included in the M-channel audio signal.

The binaural rendering unit 120 may output a stereo audio signal 230 including a left channel 221 and a right channel 222 by performing binaural rendering of the N-channel audio signal 220.

Accordingly, the multichannel audio signal processing apparatus 100 may down-mix the input M-channel audio signal 210 in advance prior to performing binaural rendering of the N-channel audio signal 220, without directly performing binaural rendering of the M-channel audio signal 210. Through this operation, the number of channels to be processed in binaural rendering decreases and thus, an amount of filtering calculation required for binaural rendering may decrease in practice.

Figure 3:
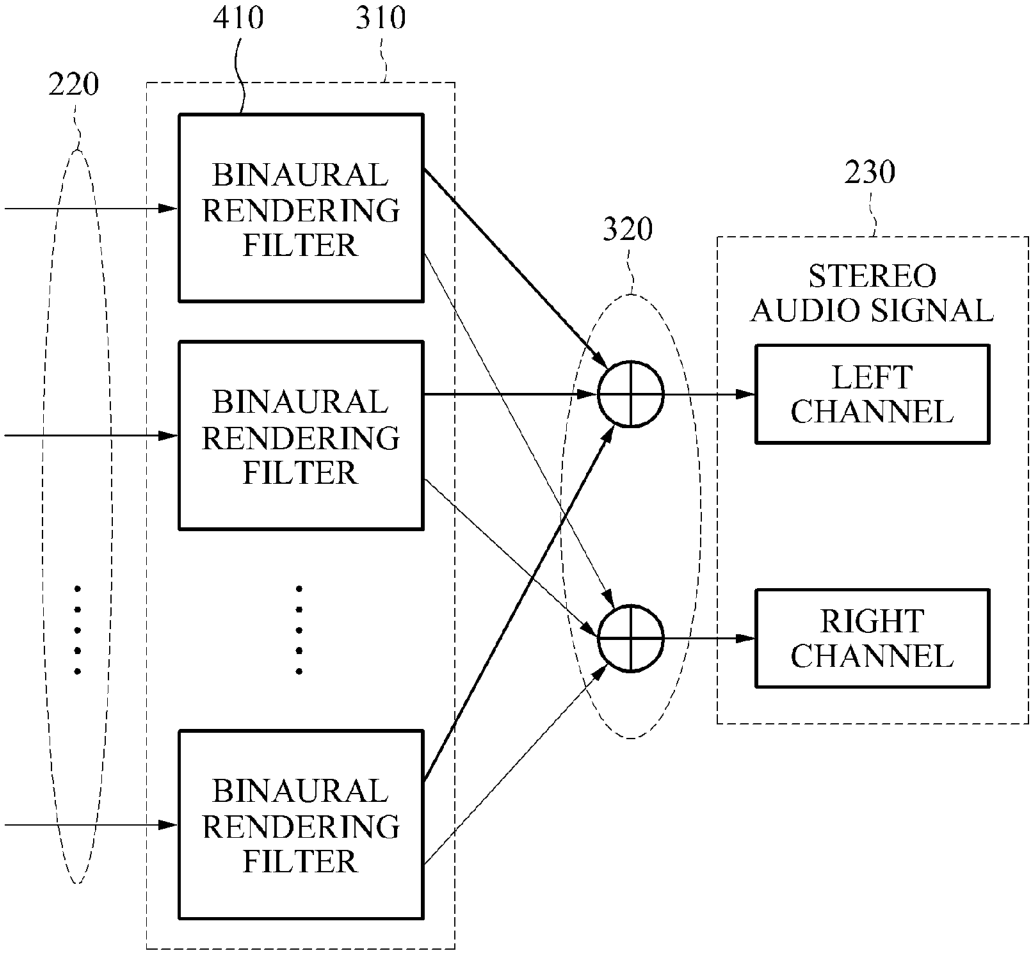
FIG. 3 is a diagram illustrating an operation of a binaural rendering unit according to an embodiment of the present invention.

FIG. 3 is a diagram illustrating an operation of a binaural rendering unit according to an embodiment of the present invention.

The N-channel audio signal 220 down-mixed from the M-channel audio signal 210 may indicate N 1-channel mono audio signals. A binaural rendering unit 310 may perform binaural rendering of the N-channel audio signal 220 using N binaural rendering filters 410 corresponding to N mono audio signals, respectively, base on 1:1.

Here, the binaural rendering filter 410 may generate a left channel audio signal and a right channel audio signal by performing binaural rendering of an input mono audio signal. Accordingly, when binaural rendering is performed by the binaural rendering unit 310, N left channel audio signals and N right channel audio signals may be generated.

The binaural rendering unit 310 may output the stereo audio signal 230 including a single left channel audio signal and a single right channel audio signal by mixing the N left channel audio signals and the N right channel audio signals. In detail, the binaural rendering unit 310 may output the stereo audio signal 230 by mixing channel-by-channel stereo audio signals generated by the plurality of binaural rendering filters 410.

Figure 4:
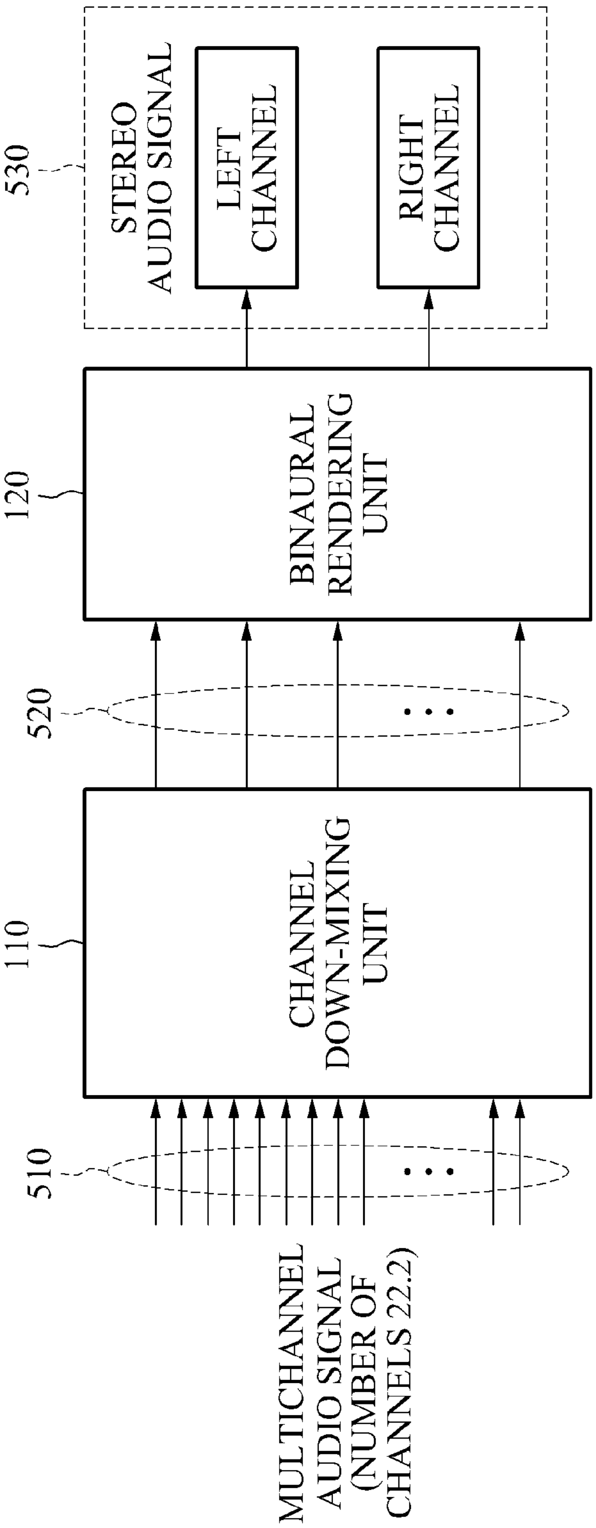
FIG. 4 is a diagram illustrating an operation of a multichannel audio signal processing apparatus according to an embodiment of the present invention.

FIG. 4 is a diagram illustrating an operation of a multichannel audio signal processing apparatus according to an embodiment of the present invention.

FIG. 4 illustrates a processing process when an M-channel audio signal corresponds to a 22.2 channel audio signal.

The channel down-mixing unit 110 may receive and then down-mix a 22.2 channel audio signal 510. The channel down-mixing unit 110 may output a 10.2 channel or 8.1 channel audio signal 520 from the 22.2 channel audio signal 510. Since the 22.2 channel audio signal 510 includes 3D spatial information, the channel down-mixing unit 110 may output the 10.2 channel or 8.1 channel audio signal 520 that maintains a sound field similar to the 22.2 channel audio signal 510 and has the minimum number of channels.

The binaural rendering unit 120 may output a stereo audio signal 530 including a left channel audio signal and a right channel audio signal by performing binaural rendering on each of a plurality of mono audio signals constituting the down-mixed 10.2 channel or 8.1 channel audio signal 520.

The multichannel audio signal processing apparatus 100 may down-mix the input 22.2 channel audio signal 510 to the 10.2 channel or 8.1 channel audio signal 520 having the number of channels less than the 22.2 channel audio signal 510 and may input the N-channel audio signal 220 to the binaural rendering unit 120, thereby decreasing an amount of calculation required for binaural rendering compared to the existing method and performing binaural rendering of a multichannel audio signal having a relatively large number of channels.

FIG. 5 is a table showing an example of location information of a loudspeaker used by a multichannel audio signal processing apparatus according to an embodiment of the present invention.

5.1 channel, 8.1 channel, 10.1 channel, and 22.2 channel audio signals may have input formats and output formats of FIG. 5.

Referring to FIG. 5, loudspeaker (LS) labels of 8.1 channel, 10.1 channel, and 22.2 channel audio signals may start with "U", "T", and "L". "U" may indicate an upper layer corresponding to a loudspeaker positioned at a location higher than a user, "T" may indicate a top layer corresponding to a loudspeaker positioned on a head of the user, and "L" may indicate a lower layer corresponding to a loudspeaker positioned at a location lower than the user.

Here, audio signals played back using the loudspeakers positioned on the upper layer, the top layer, and the lower layer may further include 3D spatial information compared to an audio signal played back using a loudspeaker positioned on a middle layer. For example, the 5.1 channel audio signal played back using only the loudspeaker positioned on the middle layer may not include 3D spatial information. The 22.2 channel, 8.1 channel, and 10.1 channel audio signals using the loudspeakers positioned on the upper layer, the top layer, and the lower layer may include 3D spatial information.

In this case, when an input multichannel audio signal is the 22.2 channel audio signal, the 22.2 channel audio signal may need to be down-mixed to the 10.1 channel or 8.1 channel audio signal including the 3D spatial information in order to maintain a sound field corresponding to a 3D effect of the 22.2 channel audio signal.

Figure 6:
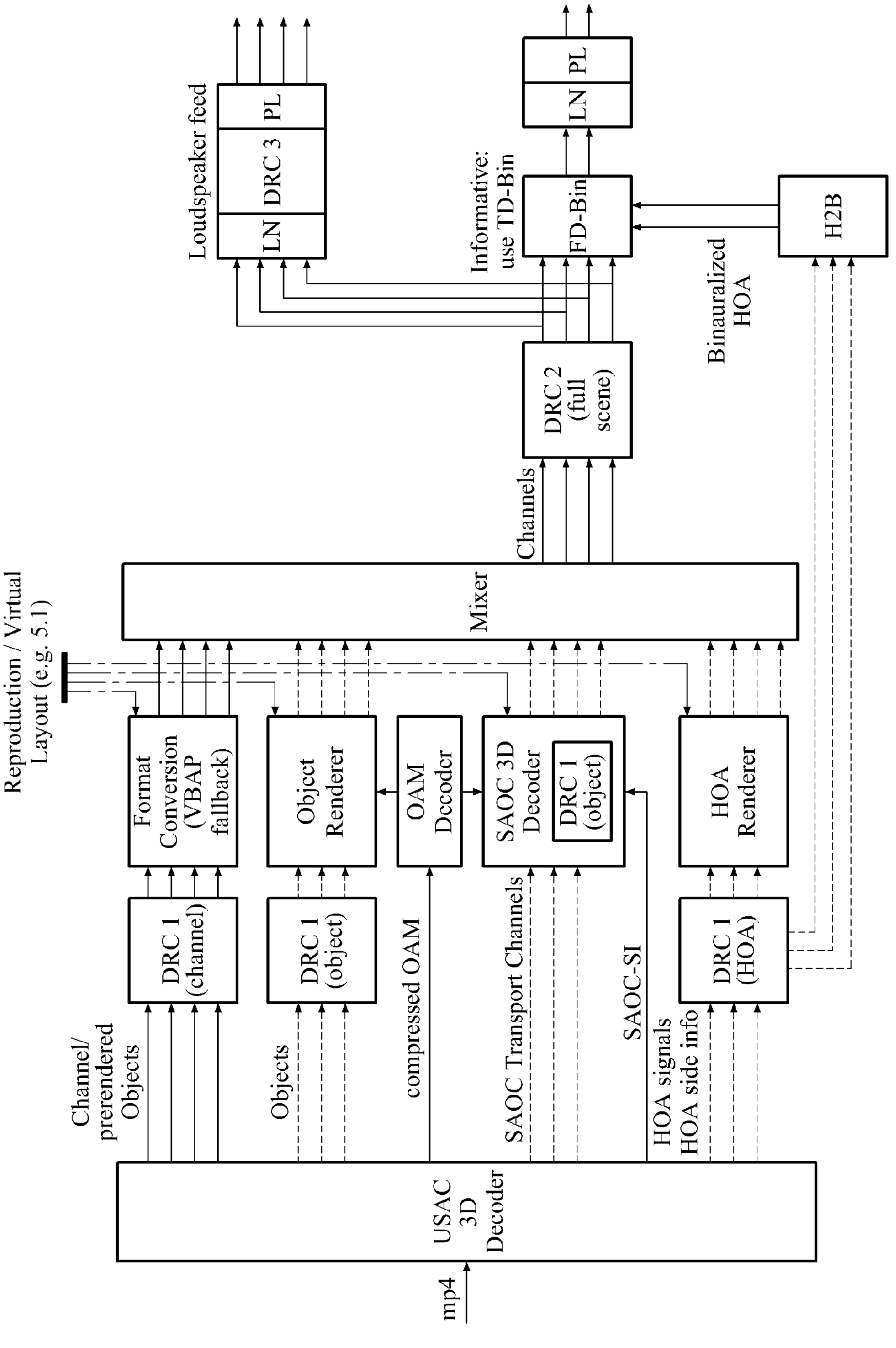
FIG. 6 is a diagram illustrating a three-dimensional (3D) audio decoder including a multichannel audio signal processing apparatus according to an embodiment of the present invention.

FIG. 6 is a diagram illustrating a 3D audio decoder including a multichannel audio signal processing apparatus according to an embodiment of the present invention.

Referring to FIG. 6, the 3D audio decoder is illustrated. A bitstream generated by the 3D audio decoder is input to a unified speech audio coding (USAC) 3D decoder in a form of MP4. The USAC 3D decoder may extract a plurality of channel/prerendered objects, a plurality of objects, compressed object metadata (OAM), spatial audio object coding (SAOC) transport channels, SAOC side information (SI), and high-order ambisonics (HOA) signals by decoding the bitstream.

The plurality of channel/prerendered objects, the plurality of objects, and the HOA signals may be input through a dynamic range control (DRC1) and may be input to a format conversion unit, an object renderer, and a HOA renderer, respectively.

Outputs results of the format conversion unit, the object renderer, the HOA render, and a SAOC 3D decoder may be input to a mixer. An audio signal corresponding to a plurality of channels may be output from the mixer.

The audio signal corresponding to the plurality of channels, output from the mixer, may pass through a DRC 2 and then may be input to a DRC 3 or frequency domain (FD)-bin based on a playback terminal. Here, FD-Bin indicates a binaural renderer of a frequency domain.

Most renderers described in FIG. 6 may provide a quadrature mirror filter (QMF) domain interface. The DRC 2 and the DRC 3 may use a QMF expression for a multiband DRC.

The format conversion unit of FIG. 6 may correspond to a multichannel audio signal processing apparatus according to an embodiment of the present invention. The format conversion unit may output a channel audio signal in a variety of forms. Here, a playback environment may indicate an actual playback environment, such as a loudspeaker and a headphone, or a virtual layout arbitrarily settable through an interface.

Here, when the format conversion unit performs a binaural rendering function, the format conversion unit may down-mix an audio signal corresponding to a plurality of channels and then perform binaural rendering on the down-mixed result, thereby decreasing the complexity of binaural rendering. That is, the format conversion unit may sub-sample the number of channels of a multichannel audio signal in a virtual layout, instead of using the entire set of a binaural room impulse response (BRIR) such as a given 22.2 channel, thereby decreasing the complexity of binaural rendering.

According to embodiments of the present invention, it is possible to decrease an amount of calculation required for binaural rendering by initially down-mixing an M-channel audio signal corresponding to a multichannel audio signal to an N-channel audio signal having the number of channels less than the M-channel audio signal, and by performing binaural rendering of the N-channel audio signal. In addition, it is possible to effectively perform binaural rendering of the multichannel audio signal having a relatively large number of channels.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A multichannel audio signal processing method processed by a decoder, comprising:
- generating an N-channel audio signal by down-mixing an M-channel audio signal in a format converter according to reproduction layout; and
- outputting the N-channel audio signal,
- wherein a plurality of channels corresponding to the M-channel audio signal are inputted to the format converter through a first dynamic range control (DRC1).

2. The method of claim 1, wherein the M-channel audio signal includes a height channel,
- wherein the generating the N-channel audio signal comprises downmixing the M-channel audio signal to minimize loss of the height channel included in the M-channel audio signal to generate the N-channel audio signal including the height channel.

3. The method of claim 1, wherein the number of M channels is greater than the number of N channels.

4. A format converter comprising:
- one or more processor configured to:
- generate an N-channel audio signal by down-mixing an M-channel audio signal in a format converter according to reproduction layout; and
- output the N-channel audio signal,
- wherein a plurality of channels corresponding to the M-channel audio signal are inputted to the format converter through a first dynamic range control (DRC1).

5. The format converter of claim 4, wherein the M-channel audio signal includes a height channel,
- wherein one or more processor downmix the M-channel audio signal to minimize loss of the height channel included in the M-channel audio signal to generate the N-channel audio signal including the height channel.

6. The method of claim 4, wherein the number of M channels is greater than the number of N channels.

* * * * *